United States Patent
Tsou et al.

(10) Patent No.: US 6,855,660 B2
(45) Date of Patent: Feb. 15, 2005

(54) RHODIUM ELECTROCATALYST AND METHOD OF PREPARATION

(75) Inventors: Yu-Min Tsou, Princeton, NJ (US); Hua Deng, Warrington, PA (US); Gian Nicola Martelli, Milan (IT); Robert J. Allen, Saugus, MA (US); Emory S. De Castro, Nahant, MA (US)

(73) Assignee: De Nora Elettrodi S.p.A. (IT)

( * ) Notice: Subject to any disclaimer, the term of this patent is extended or adjusted under 35 U.S.C. 154(b) by 378 days.

(21) Appl. No.: 10/141,108

(22) Filed: May 8, 2002

(65) Prior Publication Data

US 2003/0086862 A1 May 8, 2003

Related U.S. Application Data

(60) Provisional application No. 60/344,761, filed on Nov. 7, 2001.

(51) Int. Cl.$^7$ ............... B01J 27/02; B01J 27/045; C25B 11/00; H01M 4/86; C25C 1/02
(52) U.S. Cl. ............... 502/216; 502/223; 204/290.14; 204/290.01; 204/282; 204/283; 204/252; 204/291; 429/14; 429/40; 429/42; 429/44; 205/620; 205/622; 205/624; 205/625; 205/635
(58) Field of Search ............... 502/216, 223; 204/290.14, 290.01, 282, 283, 252, 291; 429/40, 42, 14, 44; 205/620, 622, 624, 625, 635

(56) References Cited

U.S. PATENT DOCUMENTS 6,149,782 A * 11/2000 Allen et al. ............ 204/290.14
6,358,381 B1 * 3/2002 Allen et al. ............ 204/283
6,402,930 B1 * 6/2002 Allen et al. ............ 205/625

* cited by examiner

Primary Examiner—Mark L. Bell
Assistant Examiner—Patricia L. Hailey
(74) Attorney, Agent, or Firm—Muserlian, Lucas and Mercanti

(57) ABSTRACT

A rhodium sulfide electrocatalyst formed by heating an aqueous solution of rhodium salt until a steady state distribution of isomers is obtained and then sparging hydrogen sulfide into the solution to form the rhodium sulfide and a membrane electrode assembly with the said electrode and a process for electrolyzing hydrochloric acid.

13 Claims, 3 Drawing Sheets

Typical Data from Rotating Disk Electrode
Evaluating E 1/2 from RDE Data, 3600 rpm
Peak position at full and half height

RHODIUM ELECTROCATALYST AND METHOD OF PREPARATION

This application claims benefit 60/344,761 Nov. 7, 2001.

FIELD OF THE INVENTION

An improved novel rhodium sulfide catalyst for reduction of oxygen in industrial electrolyzers which is highly resistant towards corrosion and poisoning by organic species, thus making it particularly suitable for use in aqueous hydrochloric acid-electrolysis, also when technical grade acid containing organic contaminants is employed. By modifying the method of preparation, the activity and consistency of the catalyst is substantially improved.

STATE OF THE ART

The electrolysis of aqueous HCl solutions is a well known method for the recovery of high-value chlorine gas. Aqueous hydrochloric acid is an abundant chemical by-product, especially in chemical plants making use of chlorine as a reactant: in this case, the chlorine evolved in the anodic compartment of the electrolyzer can be recycled as a feedstock to the chemical plant. Electrolysis becomes extremely attractive when the standard hydrogen-evolving cathode is substituted with an oxygen-consuming gas diffusion electrode due to the significant drop in energy consumption. The ability of the gas diffusion electrode to operate successfully in this context is crucially dependent on the nature and performance of the catalyst, and also on the structure of the gas diffusion electrode.

Platinum is generally acknowledged as the most effective catalyst for the electroreduction of oxygen in a wide range of conditions. The activation of gas diffusion electrodes with platinum based catalysts is well known in the art, and finds widespread application in fuel cells and electrolyzers of many kinds. However, the case of aqueous HCl electrolysis poses some serious drawbacks to the use of platinum as cathodic catalyst, as it is inevitable for the gas diffusion cathode to come at least partially in contact with the liquid electrolyte, which contains chloride ion and dissolved chlorine. First of all, platinum is susceptible to chloride ion poisoning which negatively affects its activity toward oxygen reduction. A second source of poisoning is constituted by contaminant species, especially organic species, which are in most of the cases dissolved in the by-product hydrochloric acid undergoing electrolysis.

Even more importantly, the combined complexing action of hydrochloric acid and dissolved chlorine gas changes the platinum metal into a soluble salt which is dissolved away, making this material inappropriate for use in gas diffusion electrodes. Furthermore, extremely careful precautions have to be taken during the periodical shut-downs of the electrolyzers, otherwise the sudden shift in the cathodic potential, combined with the highly aggressive chemical environment, causes the dissolution of a significant amount of catalyst, and the partial deactivation of the remaining portion. While tailored procedures for planned shut-downs of the electrolyzers can be set up for additional costs, little or nothing can be done in the case of a sudden, uncontrolled shut-down due to unpredictable causes like power shortages in the electric network.

Other platinum group metals appear to follow a similar fate. For example, according to Pourbaix' Atlas of Electrochemical Equilibria in Aqueous Solutions, finely divided rhodium metal dissolves in hot concentrated sulfuric acid, aqua regia, and oxygenated hydrochloric acid. Similarly, (hydrated) $Rh_2O_3 \cdot 5H_2O$ dissolves readily in HCl and other acids. These problems have been partially mitigated with the disclosure of the rhodium/rhodium oxide based catalyst described in U.S. Pat. No. 5,958,197. In particular, the rhodium/rhodium oxide system, although slightly less active than platinum towards oxygen reduction, is not poisoned by chloride ions. Also the chemical resistance to aqueous hydrochloric acid with small amounts of dissolved chlorine is sensibly enhanced with respect to platinum. However, an activation step is needed to obtain a sufficiently active and stable form of this catalyst, and some limitations arise when such a catalyst has to be included in a gas diffusion electrode. For instance, the chemical and electronic state of the catalyst is changed upon sintering in air, a very common step in gas diffusion electrode preparations known in the art. Cumbersome and/or costly operations have to be carried out to replace this step, or to restore the active and stable form of the catalyst afterwards, as disclosed in U.S. Pat. No. 5,958,197. The limitations inherent with the aforementioned rhodium/rhodium oxide were overcome by the novel rhodium sulfide catalyst U.S. Pat. No. 6,149,782. We have found that by introducing some changes in the method of preparation, some unexpected gains in performance and consistency are obtained over that disclosed in U.S. Pat. No. 6,149,782.

OBJECTS OF THE INVENTION

It is an object of the invention to provide an improved catalyst for oxygen reduction having desirable and unexpected chemical stability towards highly corrosive media, whereby these improvements are realized through pretreating the starting materials.

It is another object of the invention to provide a improved catalyst for oxygen reduction having desirable and unexpected electrocatalytic activity in presence of organic contaminants.

It is another object of the invention to provide novel gas diffusion electrodes with the improved catalyst therein having desirable and unexpected electrocatalytic properties, as well as lower and more consistent operating voltages.

It is another object of the invention to provide an electrolytic cell containing a gas diffusion electrode of the invention and to provide an improved method of electrolyzing hydrochloric acid to chlorine.

These and other objects and advantages of the invention will become obvious from the following detailed description.

INVENTION

The novel electrochemical catalyst of the invention is comprised of rhodium sulfide, which may be either supported on a conductive inert carrier or unsupported. This catalyst does not require any activation step prior to its use, and surprisingly retains all of its electrocatalytic activity towards oxygen reduction in presence of chloride ions and organic molecules. Moreover, the catalyst is surprisingly not dissolved by the complexing action of aqueous hydrochloric acid chlorine mixtures, thereby requiring no particular precautions during shut-downs when used in hydrochloric acid electrolyzers.

The catalyst is preferably coated on at least one side of a web, and may be used alone, with a binder, blended with a conductive support and a binder, or supported on a conductive support and combined with a binder. The binder may be hydrophobic or hydrophilic, and the mixture can be coated on one or both sides of the web. The web can be woven or non-woven or made of carbon cloth, carbon paper, or any conductive metal mesh resistant to corrosive electrolytic solutions.

Examples of high surface area supports include graphite, various forms of carbon and other finely divided supports but carbon black is preferred.

Such catalyst coated webs can be employed as gas diffusion cathodes exhibiting cell voltages, current densities and a lifetime that could not be previously obtained under normal operating conditions, especially when used in highly aggressive environments and with low purity reactants, such as the case of electrolysis of by-product hydrochloric acid.

One improvement in the preparation of the catalyst consists of first heating the precursor rhodium chloride at reflux until a steady-state distribution of isomers is obtained. The isomeric distribution of the rhodium chloride is followed with UV/VIS in order to assure steady-state has been obtained. The resulting rhodium sulfide has an improved performance as can be seen by an increase in half-wave potential results.

Another improvement in the electrocatalyst of rhodium sulfide occurs when electrocatalyst is deposited upon carbon black which has been highly dispersed whether or not the rhodium sulfide has been refluxed.

Prior to mixing with the rhodium chloride salt, carbon black is dispersed by high energy mixers. One method is accomplished via a microfluidizer, which is a pressure-driven system and is available through such companies as Microfluidics (Newton, Mass.). Other methodologies use rotor/stator methodology whereby one set of blades is fixed while the another set is spun at high rates around the fixed set. Such action creates high shear on the sample. Rotor/stator operations are often performed in batch mode. Another device is a mill where a spinning barrel with plates performs the function of delivering shear energy to the solution. Kady Company (Scarborough, Me.) provides a range of these machines. These and similar devices are called "homogenizers" and perform the vital function of dispersing solids into solvent in a uniform and consistent manner. The following Example section will describe such a preparation and report results for Rhodium sulfide catalyst unanticipated by simple mixing to form a carbon black dispersion.

The best results are obtained with a combination of the two features, namely a single isomer of rhodium chloride deposited on a highly dispersed carbon black resulting in an electrocatalyst with a substantial increase in half-wave potential.

The mixture of refluxed rhodium chloride solution is mixed with the dispersed carbon black, and subjected to a ultrasound step. A rhodium sulfide complex is then prepared upon sparging hydrogen sulfide gas in an aqueous solution of a water-soluble rhodium salt. Nitrogen gas may be used as a carrier for hydrogen sulfide, and a pure nitrogen flow may advantageously be used to purge excess hydrogen sulfide upon completion of the reaction. The resulting solids are recovered by filtration, washing and drying to constant weight at 125° C., for example. The resulting form of rhodium sulfide must be heated in an inert atmosphere at 550 to 650° C., and preferably above 600° C. to form a well defined crystalline form of rhodium sulfide catalyst. The heating may be for several hours depending on the size of the batch, and the choice of the temperature is crucial for the formation of a sufficiently stable and active catalyst.

If the temperature is too low such as 300° C., the resulting crystallites are not well-defined and the catalyst stability is not sufficient. If the temperature is too high, i.e., 725° C., the unsupported catalyst has excellent acid stability but does not posses adequate electrochemical activity.

In the following examples, there are described several preferred embodiments to illustrate the invention. However, it is to be understood that the invention is not intended to be limited to the specific embodiments.

EXAMPLE 1

Figure 5:
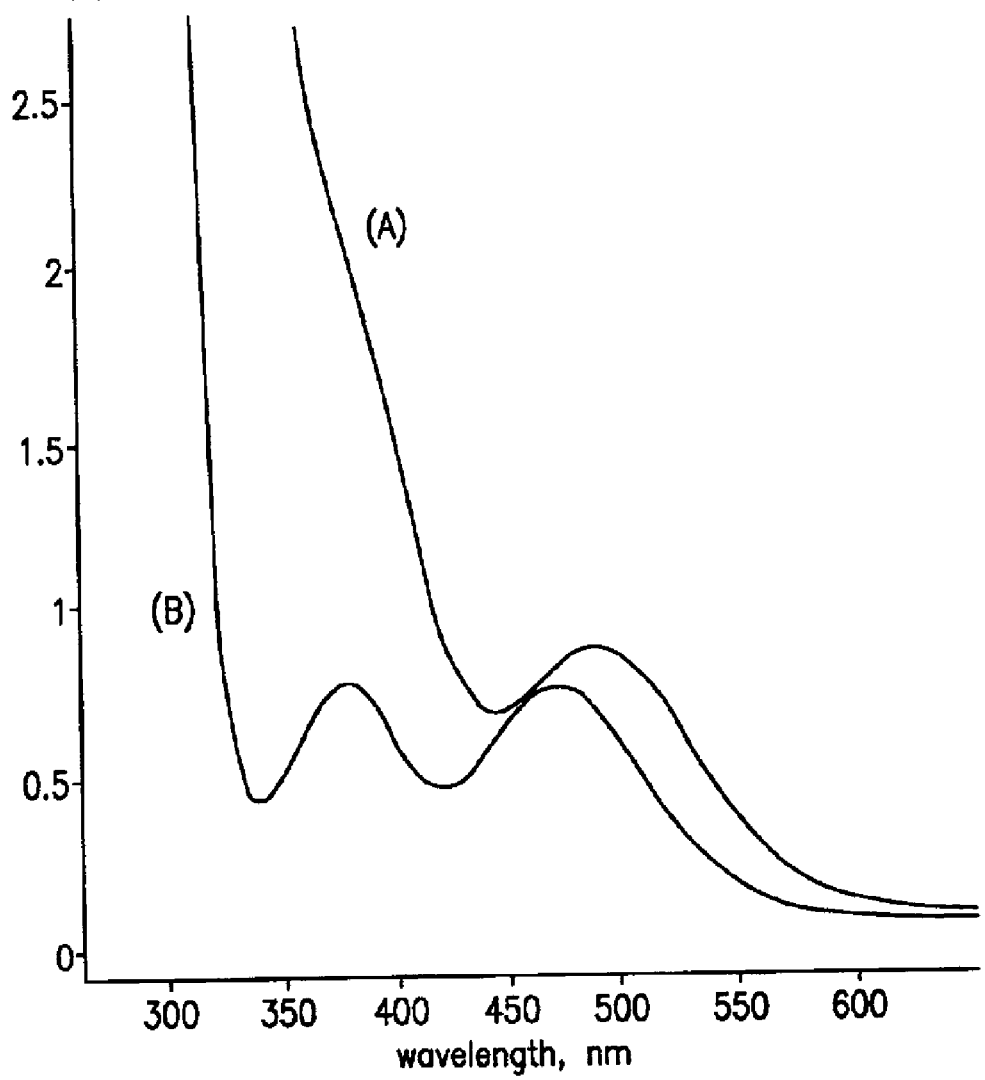
FIG. 5 is a typical UV/VIS spectrum obtained on solutions of $RhCl_3*nH_2O$ immediately upon dissolution and after 2.5 hours of reflux.

A 100 gram batch of Rhodium sulfide on carbon is prepared as follows. A quantity of rhodium chloride salt is added to deionised water to make a concentration of Rh metal of about 69 g/l. This solution is refluxed (95–100 deg C.) overnight, i.e., about 16 hours. The progress of the reflux is followed with a UV-VIS Spectrum. The ratio of absorption at 470–475 nm to that of 374–380 nm should be in the range of 0.9–1.1, and more preferable 1 when the reflux is complete. Refer to FIG. 5 for a typical spectrum obtained after 2.5 hours of reflux.

In a separate operation, mix 64.00 g Vulcan XC-72 in 2.0 L deionized water placed in a large (about 4 liter) beaker. The mixture is subjected to high-shearing mixing by a Silverson® rotor-stater. The mixture is vigorously agitated in both horizontal and vertical direction at 6500–9000 rpm for 15 minutes. After high-shear mixing, the dispersed carbon mixture is transferred to the vessel with a large stirring bar and 400 mL of 69 g/L RhO solution (27.6 g Rh metal) is added. Mix the solution on the magnetic stir plate for at least 5 minutes.

Further process the metal and carbon black mixture by placing the vessel in an ultrasonic bath for 20 minutes.

Purge the vessel with nitrogen for 30–60 min at a rate of approximately 30 L/hr.

Begin bubbling $H_2S$ through the vessel at the desired flow rate, typically about 8–9 liter/hour while the nitrogen continues at 30 L/hr. Five hours after $H_2S$ bubbling starts, a small sample of solution mixture should be taken. It is filtered and Rh-concentration checked with XRF or UV-V is to confirm adsorption of product on the carbon support. Hydrogen sulfide flow is discontinued after confirmation of complete adsorption of product on carbon. The nitrogen purge is continued overnight.

On the next day, the catalyst is filtered through a Buchner funnel using a vacuum pump without a wash except for that of a small rinse of the vessel (~30 ml). The filtered intermediate is placed into an oven overnight at a temperature of ~120° C. After drying, a furnace is prepared by purging with argon for 1 hour at room temperature. With continuous inert purge, the temperature of the furnace is ramped from room temperature to 650° C. in one hour. The temperature is held at 650° C. for 2 hours. After the heater is turned off, the furnace is allowed to cool down in argon to room temperature overnight. Once removed from the furnace, the catalyst is analyzed and fabricated into a gas diffusion electrode or membrane electrode assembly.

COUNTER EXAMPLE 1

One hundred grams of supported rhodium sulfide were prepared by the following procedure: 57.3 grams of $RhCl_3.xH_2O$ (39.88% given as rhodium metal) were dissolved in 2 liters of de-ionised (D.I.) water, without any pH adjustment. 53.4 grams of Vulcan XC-72 active carbon were added, and the mixture was slurried with a magnetic stirrer. Hydrogen sulfide gas was then sparged through the slurry at ambient temperature using nitrogen as a carrier gas. The mixture has been allowed to react as described for 7 hours. Upon completion of the reaction, nitrogen was purged through the system to remove residual $H_2S$. The remaining solution was vacuum filtered to isolate the solids, which were then washed with de-ionised water and dried at 125° C. to a constant weight.

The resulting catalyst cake was finally ground to a fine powder and subjected to 650° C. under flowing argon for two hours. A load of catalyst on carbon of 27–28%, given as rhodium metal, was obtained.

EXAMPLE 2

The catalysts of all the above reported examples, along with commercially available platinum on Vulcan XC-72 (for example from E-TEK, Inc.), can be utilised in several different configurations such as listed below. The catalyst of this invention is not limited by the structure of the gas diffusion electrode.

a). ELAT: A web of carbon cloth with a warp-to-fill ratio of unity and about 25 to 50 yarns per inch, and a 97–99% of carbon content was selected from a commercially available product with a thickness of 10 to 15 mils. Carbon cloth with a thickness of 5 to 50 mils could have advantageously been used for this purpose. A mixture of fluorinated polymer (polytetrafluoroethylene, P.T.F.E. commercialised by DuPont under the trademark Teflon®) and Shawinigan Acetylene Black (SAB) carbon, commercialized by Cabot Corp., was coated on each side of the carbon cloth, air drying at room temperature after each coat, until reaching a total loading of 8 to 10 mg/cm². A mixture of the powdered catalyst and Teflon® was then applied on one side of the carbon web in multiple coats until obtaining a layer of 0.5 to 2 mg of catalyst per square cm. After the final coat, the carbon cloth was heated to 340° C. for 20 minutes.

b). Single-sided ELAT: The above procedure for preparation of the ELAT was repeated except the SAB/Teflon® mixture was applied to only one side of the carbon cloth, with a loading of 4 to 5 mg/cm². The catalyst coat was applied on the same side, on top of the SAB/Teflon® layer.

c). Flow-through Electrode: A carbon cloth with the same specifications for the ELAT electrode was selected and 2 to 5 coats of a mixture of catalyst powder and Teflon® were applied to one side thereof. The coated fabric was then heated at 340° C. for about 20 minutes to obtain 1.03 mg/cm² of rhodium metal. The final heating step or sintering step is believed to melt the Teflon® and distribute it across the carbon catalyst. However, the sintering step may be successfully omitted for this electrode.

d). Membrane Electrode Assembly: An ink was formulated consisting of approximately 3 parts of catalyst and 1 part (as dry weight) of Nafion® ionomer, such as that sold by Solutions Technology, (Mendenhall, Penn.) as a suspension in a mixture of water and lower aliphatic alcohols such as methanol, propanol, and/or butanol. The ink was applied to a Nafion® 324 ion exchange membrane, commercialised by DuPont, held in place with a heated vacuum table, via spraying or painting. Other ion exchange membranes known in the art may have alternatively been utilised. Subsequent layers of the ink were applied until depositing 0.05 to 1 mg of metal/cm² of catalyst. The assembly was further heated to remove solvents, and assembled with an appropriate electrode backing such as those disclosed in U.S. Pat. No. 6,103,077. The catalyst ink as described could alternatively have been applied to an electrode backing, subsequently heated to remove solvents and assembled with an ion exchange membrane to form an equivalent membrane electrode assembly.

EXAMPLE 3

Figure 1:
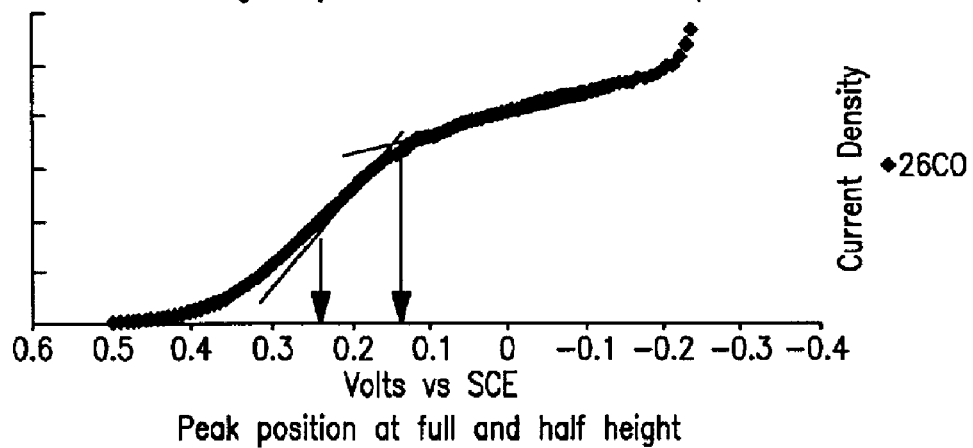
FIG. 1 is a typical hydrodynamic voltammogram obtained for a sample of rhodium sulfide catalyst supported on the tip of a Rotating Disk Electrode (RDE) and subjected to a voltage scan. The three-electrode set up employs a saturated calomel reference electrode (SCE) and a platinum wire counter electrode. The solution is 5% HCl, and the test is at room temperature saturated with air. The ½ wave position at half plateau height is used as the analytical voltage.

In order to demonstrate the consistency of the catalyst prepared according to Example 1 and compare multiple batches of catalyst prepared using the improved method to the method of Counterexample 1, the rotating disk electrode (RDE) was employed to obtain electrochemical data independently of laboratory cell testing. A dilute ink of rhodium sulfide on carbon is prepared with by mixing 33 mg of supported catalyst with 25 mL iso-propyl alcohol and 25 mL Dl water. A total of 1 microliter of this ink is applied in two to three coats onto the tip of a glassy carbon rotating electrode (6 mm dia). Once the ink is dried, an additional layer of 5% Nafion® ionomer solution is applied (10 microliters) and evaporated to dryness. The electrode is placed in a solution of 5% HCl that is at room temperature. A platinum counter electrode and saturated calomel reference electrode (SCE) is connected to a PAR 373 Potentiostat along with the rotating disk electrode. Under various rotation rates, a potential scan is applied whereby a plateau that represents reduction of dissolved oxygen is recorded. The wave potential at one half the plateau height (See FIG. 1) is used as the analytical indicator for the catalyst's oxygen reduction reaction. The more positive potentials indicate a greater facility for oxygen reduction.

A series of gas diffusion electrodes as described in Example 2B are fabricated with catalysts prepared from the methods of either Example 1 or Counterexample 1. The resulting gas diffusion electrodes are tested using the laboratory test cell as described below.

Figure 2:
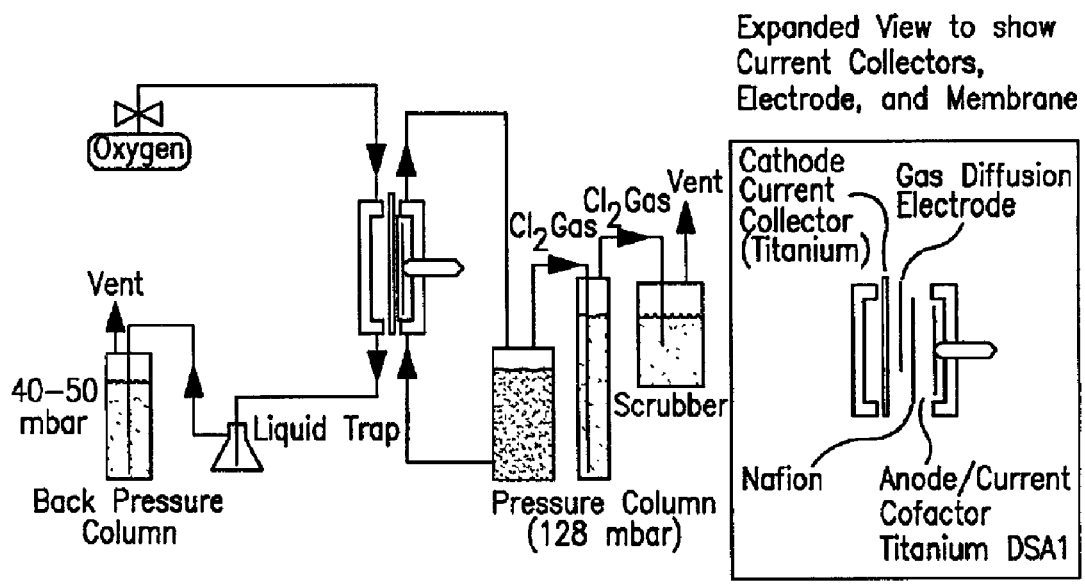
FIG. 2 is a schematic of flow system for testing gas diffusion electrodes employed in the generation of Cl2 from HCl using an oxygen depolarized gas diffusion electrode.

The electrolysis laboratory test is arranged according to the scheme of FIG. 2. The exposed electrode surface area was 100 cm² and the membrane was Nafion 324. The anode was titanium mesh activated with ruthenium oxide catalyst. oxygen was fed to the cathode at a rate of up to 2.5-fold stoichiometric excess at ~5 cm water pressure and 13–15% aqueous hydrogen chloride electrolyte was fed to the anode. The electrolyte flow rate was 0.372 m$^3$/hour/m$^2$ at a back-pressure of 200 mbar. Unless stated otherwise, the cell voltages are recorded at 4 kA/m$^2$ after three days of operation. All voltages were uncorrected for current collector resistance. The temperature of the cell and electrolyte was held at 55° C.±5° C.

Figure 3:
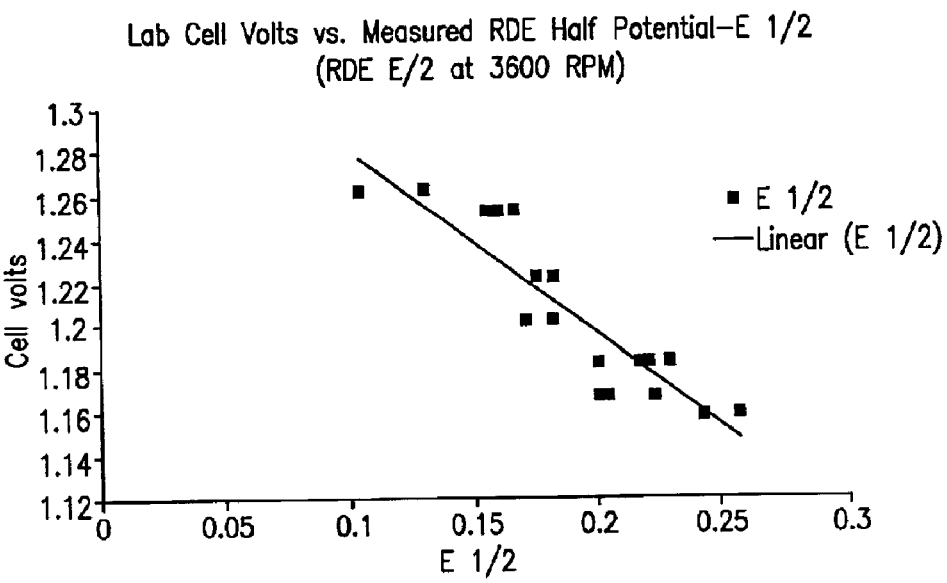
FIG. 3 is a plot derived from a series of catalysts prepare using the methods of either Example 1 or Counterexample 1, and incorporated into gas diffusion electrodes of Example 2B. Each catalyst was evaluated using the RDE and then evaluated in a gas diffusion electrode tested in the set-up of FIG. 2. The plot compares the analytical voltage from the RDE (El/2) to that obtained in the Lab Cell for the same catalyst.

A plot of RDE wave voltage at ½ height vs. lab cell voltage is shown in FIG. 3. Considering the range of variables stemming from reproducibility of fabrication of the gas diffusion electrode to the statistical reproducibility of a laboratory test cell, the correlation between the wave voltage at ½ height and the lab cell voltage indicates the RDE method is very good. As the analytical indicator for RDE moves to positive potentials, the laboratory cell operation voltage decreases. This correlation confirms that the analytical indicator is a relevant measurement for catalyst performance in actual systems.

Multiple batches of catalyst are tested using the RDE methodology, and the average of 15 batches prepared using the counter example 1 method are compared to 10 batches prepared using the method of Example 1. Table 1 summarizes the results obtained by the RDE method.

TABLE 1

RDE Peak position at ½ plateau height (vs. SCE)

| Rhodium sulphide preparation method | Counter Example 1 | Example 1 | delta |
|---|---|---|---|
| Number of samples | 15 | 10 | |
| Peak Position at half height, vs SCE | 160 mV | 230 mV | 70 mV |
| St. Deviation | 24 | 19 | |
| Rel. St. Deviation | 15% | 8.3% | |

This table demonstrates that the improvements of dispersing-carbon, refluxing the rhodium salt precursor, and applying ultrasound to the mixture of carbon and metal salt provide an improved catalyst by both performance (average increase in half-wave of 70 mV) and consistency (decrease in relative standard deviation from 15 to 8.3%)

EXAMPLE 4

Figure 4:
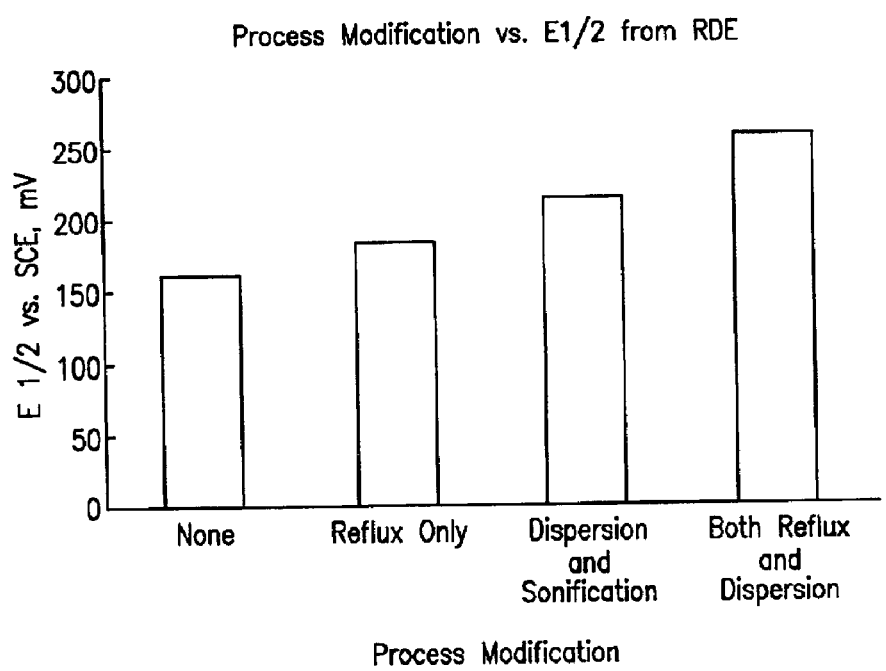
FIG. 4 shows a comparison of ½ wave positions for either the counter example 1 catalyst, catalyst prepared with only a reflux of the starting salt, catalyst prepared with only the dispersion of the carbon black and sonication of the mix, and catalyst prepared with a combination of reflux and dispersion/sonication.

We have also tested catalyst prepared incrementally by either only reflux, or only dispersion (dispersion plus ultrasound) FIG. 4 shows the typical improvements possible with each process modification. While applying only the reflux of the starting salt, or only the dispersion of the carbon black clearly shows an improvement, the combination of these additional process steps provides the greatest gain.

Various modifications of the electrocatalyst of the invention may be made without departing from the spirit or scope thereof and it is to be understood that the invention is intended to be limited only as defined in the appended claims.

What we claim is:

1. A rhodium sulfide electrocatalyst formed by heating an aqueous solution of a rhodium salt until a steady state distribution of isomers is obtained and then sparging hydrogen sulfide into the solution to form rhodium sulfide.

2. The electrocatalyst of claim 1 wherein the heating is at reflux.

3. The electrocatalyst of claim 1 supported on a conductive inert carrier.

4. The rhodium sulfide electrocatalyst of claim 3 wherein the conductive inert support is highly dispersed carbon black.

5. A membrane electrode assembly with the electrode having a deposit of the electrocatalyst of claim 1 on a conductive inert support.

6. The assembly of claim 5 wherein the support is carbon black.

7. The assembly of claim 6 wherein the carbon black is highly dispersed.

8. In the process of electrolyzing hydrochloric acid in an electrolyzer, the improvement comprising using a membrane electrode assembly of claim 7.

9. In the process of electrolyzing hydrochloric acid in an electrolyzer, the improvement comprising using a membrane electrode assembly of claim 5.

10. An electrocatalyst formed by heating an aqueous solution of a rhodium salt until a steady state distribution of isomers is obtained, and then sparging hydrogen sulfide into the solution, deposited upon highly dispersed carbon black.

11. A process for forming an electrocatalyst comprising forming a solution of a soluble rhodium salt, heating the solution to obtain a steady state distribution of rhodium isomers, sparging hydrogen sulfide through the resulting solution to precipitate rhodium sulfide and recovering the same.

12. The process of claim 11 wherein the rhodium sulfide is deposited on highly dispersed carbon black.

13. An electrocatalyst formed by heating an aqueous solution of a rhodium salt until a steady state distribution of isomers is obtained, and then sparging hydrogen sulfide into the solution to form the electrocatalyst.

* * * * *